United States Patent
Kangas et al.

(10) Patent No.: US 8,650,509 B2
(45) Date of Patent: Feb. 11, 2014

(54) TOUCHSCREEN GESTURES FOR VIRTUAL BOOKMARKING OF PAGES

(75) Inventors: P. Daniel Kangas, Raleigh, NC (US); Daniel M. Ranck, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/213,165

(22) Filed: Aug. 19, 2011

(65) Prior Publication Data

US 2013/0047125 A1     Feb. 21, 2013

(51) Int. Cl.
*G06F 3/033*     (2013.01)
(52) U.S. Cl.
USPC ............................ 715/863; 715/702; 715/206
(58) Field of Classification Search
USPC ......................................... 715/863, 206, 702
See application file for complete search history.

(56) References Cited

U.S. PATENT DOCUMENTS

| 5,761,485 A | 6/1998 | Munyan |
|---|---|---|
| 6,064,384 A | 5/2000 | Ho |
| 2003/0048250 A1 | 3/2003 | Boon et al. |
| 2003/0048305 A1 | 3/2003 | Liang et al. |
| 2004/0148574 A1 | 7/2004 | Ohtani et al. |
| 2008/0259057 A1 | 10/2008 | Brons |
| 2009/0327975 A1 | 12/2009 | Stedman |
| 2010/0020025 A1 | 1/2010 | Lemort et al. |
| 2010/0262514 A1* | 10/2010 | Westphal ........................ 705/27 |
| 2011/0050592 A1 | 3/2011 | Kim et al. |
| 2011/0209104 A1* | 8/2011 | Hinckley et al. .............. 715/863 |

FOREIGN PATENT DOCUMENTS

WO     WO2007031411 A2     3/2007

* cited by examiner

*Primary Examiner* — Weilun Lo
*Assistant Examiner* — Rashedul Hassan
(74) *Attorney, Agent, or Firm* — Katherine S. Brown; Jeffrey L. Streets

(57) ABSTRACT

A system and method are disclosed for navigating an electronic document using a touch-sensitive display screen with gestures that are reminiscent of physically handling the pages of a conventional, bound document. A user may temporarily bookmark one or more selected pages by touching the touchscreen with a finger when the pages are displayed, to mimic using a finger to hold a selected page of a conventional, bound document. Predefined gestures may be specified with different functions, such as returning to a bookmarked page or removing a bookmark.

19 Claims, 6 Drawing Sheets

TOUCHSCREEN GESTURES FOR VIRTUAL BOOKMARKING OF PAGES

BACKGROUND

1. Field of the Invention

The present invention relates to the navigation of electronic documents using a touchscreen display.

2. Background of the Related Art

The advent of the personal computer (PC) in the latter half of the twentieth century led to the widespread use of electronic devices to digitally store and process information. The technologies used in computers and other electronic devices have continued to advance, aided by economies of scale, and with ongoing reinvestment in product research and development. Factors such as increasing miniaturization and related improvements in memory density and processor speed, along with vastly improved electronic displays and user input peripherals, have led to the development of many different electronic consumer products. Modern electronic devices are now capable of storing large amounts of information in digital form, even on very compact, lightweight, and portable devices. Popular portable electronic devices with built-in or otherwise connected display screens currently include laptop computers, tablet computers, smartphones, digital music players, and handheld electronic game consoles.

Numerous uses for electronic devices have been developed to harness the ability of electronic devices to store and retrieve large amounts of information. In particular, this aspect of digital storage is commonly used for creating and storing electronic documents that may then be viewed on an electronic display. Electronic documents may be created from scratch, such as by using a word processor. Existing, paper-based documents may be converted to an electronic format, such as by electronically scanning them. Digital cameras are also commonly used to generate digital photographic images. Even complete books are now being digitized and stored in an electronic format as an alternative to carrying around physical, bound paper volumes. An example of a device that can be used to store and display books is referred to as an e-book reader, which is dedicated to the purpose of displaying electronic copies of books. The ability to store and display electronic copies of books that can be displayed page-by-page on a screen is also being emulated using software applications on devices that are not restricted to that function, such as on portable computers and smartphones.

The power and portability of electronic devices makes the use of electronic documents preferable, in many ways, to that of traditionally-bound paper-based documents, such as books, newspapers and other periodicals, and bound photo albums. For instance, the compact size and low weight of e-book readers, portable computers, and smartphones capable of storing and displaying electronic copies of books is competitive with that of traditional, paper-based media. Additionally, the built-in memory on portable electronic devices is now large enough that many documents may be stored on a single, portable device. Devices with Internet-browsing capabilities also have potential access to a virtually unlimited number of remotely-stored documents. Despite these advances in electronic document storage and viewing, however, most portable electronic devices are limited to having a single, rigid display on which to view selected pages of documents. Ongoing efforts are being made, therefore, to improve user interfaces on these devices for navigating electronic documents.

BRIEF SUMMARY

A method and device are disclosed for navigating the pages of an electronic document and bookmarking selected pages. According to a disclosed method, different pages of a multi-page electronic document are selectively displayed in a display area of a touchscreen. In response to sensing a touch by a first finger at the display area, a first selected page that is currently displayed on the touchscreen is automatically bookmarked. The method further includes navigating to a second selected page while the first finger maintains uninterrupted contact with the display area, and automatically returning to the bookmarked first selected page in response to sensing a first predefined gesture using the first finger.

A touchscreen device is also disclosed, which touchscreen includes memory for storing a multi-page electronic document and a touch-sensitive display screen configured for individually displaying one or more selected pages of a multi-page document in a display area. The touch-sensitive display screen is sensitive to a plurality of different touches spaced apart on the display screen. A primary controller is in communication with the touch-sensitive display screen and memory. The primary controller includes control logic for assigning a bookmark to a currently displayed page in response to a touch to the display area initiated during display of the currently displayed page. The primary controller further includes control logic for maintaining the bookmark for as long as the touch continues uninterrupted, and for returning to the bookmarked page in response to a predefined gesture at the touch.

DETAILED DESCRIPTION

Figure 1:
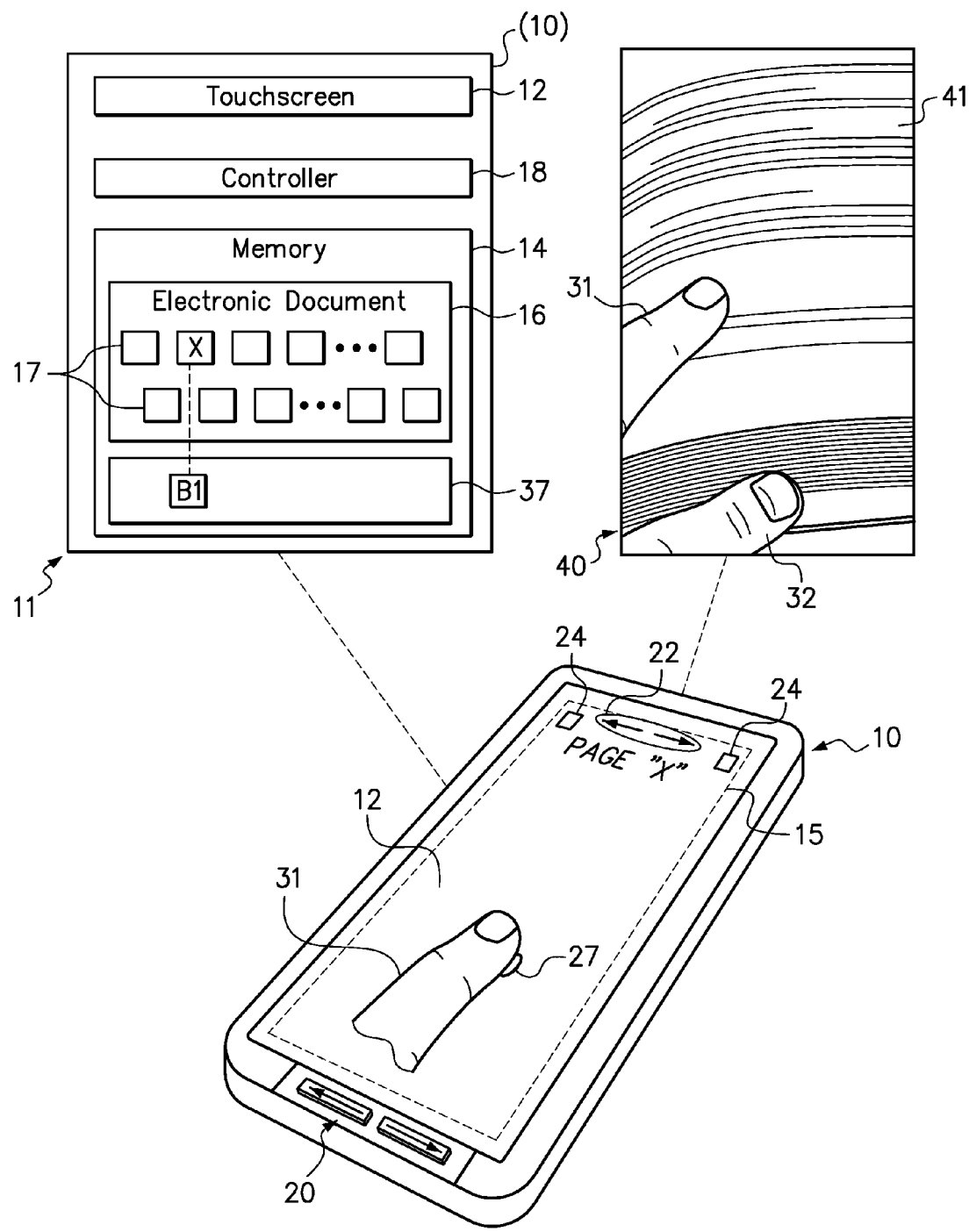
FIG. 1 includes a perspective view of a touchscreen device that allows pages of an electronic document to be navigated and bookmarked using gestures with a user's finger(s).

A system and method are disclosed for navigating an electronic document ("e-document") using a touch-sensitive display screen ("touchscreen") using gestures that are reminiscent of physically handling the pages of a conventional, bound document such as a book, magazine, spiral notebook, or ring-bound photo album. This gives the user a more realistic experience in browsing the e-document, despite the limitations of having a single screen on which to view the e-document. For example, a user may temporarily bookmark a currently-displayed page of the e-document in response to touching the touchscreen with a finger, to mimic using a finger to hold a selected page of a conventional, bound document. The user may create separate bookmarks for multiple pages, each with a separate finger. Each bookmark associates the touch that was used to create the bookmark with the page that was currently displayed when the touch was initiated. The temporary bookmark is held in memory for as long as the user maintains contact with the screen with the finger used to create the bookmark. While a page is bookmarked, the user may navigate to other pages. When the user subsequently removes a finger from the touchscreen, any bookmark associated with that finger is automatically removed, analogously to releasing a page in a conventional, bound document that was held with a finger.

When a bookmark is removed in response to removing a finger from the touchscreen, specific actions may be invoked according to any gesture leading to the removal of the finger from the touchscreen. For example, when a user has navigated to a page other than the bookmarked page, the gesture of lifting a finger from the screen with no appreciable sliding (referred to herein as a direct lift-off) may cause the touchscreen to return to displaying the bookmarked page. This gesture mimics "flipping" back to a page held by a finger in a physical, bound document when the finger used to hold that page is lifted up, away from that page. Conversely, the gesture of sliding the finger off the touchscreen immediately prior to removing the finger from the touchscreen may cause the bookmark to be removed without changing the currently-displayed page. This gesture mimics sliding a finger off a page of a bound document without changing the page.

The direct lift-off gesture may be invoked using two fingers to alternate between two bookmarked pages. A first finger may be used to bookmark a first selected page, and a second finger may be used to bookmark a second selected page. Then, by alternately lifting the first and second finger, the user can flip back and forth between the first and second selected/bookmarked pages. For example, the user could lift the first finger to retrieve the first selected page, to view the page for as long as desired. Then, the user could place that lifted finger back down to re-bookmark that page and lift the second finger to retrieve the second selected page. Placing that finger back down would re-bookmark the second page. This alternating finger gesture may be used to flip as often as necessary between two pages.

Any number of additional, optional gestures may be made available to the user, such as in a user interface (UI) providing a menu of additional gestures. For example, an optional two-finger gesture may be used to switch back and forth between two bookmarked pages by sliding instead of lifting. When two different pages are concurrently bookmarked by two different fingers, the two fingers may be alternately slid left and right in contact with the touchscreen to alternate between displaying the two bookmarked pages. This mimics the back-and-forth movement of a hand to flip between pages held by two separate fingers.

The improved user navigation of e-documents, and the systems and methods used to enable the improved user navigation, are further discussed below in connection with the accompanying figures.

FIG. 1 includes a perspective view of an embodiment of a touchscreen device 10 that allows pages 17 of an electronic document 16 to be navigated and bookmarked, using gestures that mimic using fingers to hold pages in a conventional, bound document. By way of analogy, a book 40 is depicted in the figures as an example of a conventional, bound document, having physically separable pages that may be turned by hand, to illustrate comparable gestures used to navigate and hold selected pages 41 in the book 40. A block diagram 11 shows selected components of the touchscreen device 10. The touchscreen device 10 includes a touch-sensitive display screen (i.e. touchscreen) 12, memory 14, and a controller 18. The touchscreen 12 is an interactive display screen that combines the visual output of a conventional display screen with electronic circuitry that allows for electronic input by touching a display area 15 of the touchscreen. The touchscreen 12 may be rigid or flexible, as the disclosed gestures used to navigate the e-document 16 and bookmark selected pages 17 do not require the touchscreen 12 to be flexed. The memory 14 is typically in the form of random access memory ("RAM") 14, for storing a multi-page electronic document ("e-document") 16. The controller 18 is in communication with the touchscreen 12 and memory 14 for interpreting user input and selectively displaying individual pages 17 of the e-document 16 on the touchscreen 12. The controller 18 may comprises one or more processors, such as a central processing unit ("CPU"), application-specific integrated circuit ("ASIC"), or graphics card. The touchscreen device 10 may be a portable device having an integrated touchscreen 12, such as in the case of a tablet-based computer (i.e. a tablet computer), a personal digital assistant (i.e. PDA), or a smartphone. Other suitable examples of touchscreen devices include a desktop computer or computer terminal, an electronic appliance, a computerized kiosk, and a digital camera.

The touchscreen 12 may use any of a variety of different technologies for sensing and interpreting physical contact to the touchscreen 12 with a user's fingers or a handheld implement. A capacitive touchscreen, for example, includes an insulator, such as glass, coated with a transparent conductor, wherein touching the surface of the panel with a bare finger causes a localized change in capacitance. Surface capacitive technology is one type of capacitive touchscreen technology wherein a small voltage is applied to one side of the insulator, such that contact with a user's finger changes a capacitance. Projected capacitive technology is another example of a capacitive technology wherein an X-Y grid pattern of electrodes is formed by etching into the conductive layer. A resistive touchscreen is another touchscreen technology that uses inner and outer layers coated with a transparent metal oxide coating, wherein touching the touchscreen by hand completes a circuit between the inner and outer layers. An infrared (IR) touchscreen is another example of touchscreen technology, which uses an array of X-Y infrared LED beams that intersect at different locations to identify where the touchscreen is touched. A surface acoustic wave (SAW) is another example of a touchscreen that uses ultrasonic waves that pass over a panel, such that a portion of the wave is absorbed when the panel is touched. Any one of these, or future developed touchscreen technologies, may be used in the touchscreen to sense touch.

The e-document 16 is electronically demarcated into a plurality of pages 17 stored in memory. Only selected pages 17 are retrieved to be displayed at any one time. Typically, only one page 17 or at most a small number of pages 17 are displayed on the touchscreen 12 at any given instant, due to the limited display area of the touchscreen 12. Attempting to display many pages 17 at once on the touchscreen 12 may require the displayed pages to be scaled down to an extent that the contents of the pages 17 may not be readable or visually discernable. A currently displayed page 17 is fit to a pre-defined display area 15. In this example, the display area 15 is very nearly the full area of the touchscreen 12. Some additional amount of the touchscreen 12 outside the display area 15 may be reserved for other graphical objects, such as status indicators for the touchscreen device 10.

Any of a variety of navigational features may be provided with the touchscreen device 10 for selecting pages 17 to be displayed. These navigational features may include physical buttons 20 on the body of the touchscreen device 12 or analogous virtual buttons 24 displayed somewhere on the touchscreen 12. The buttons, whether physical or virtual, may be used to select pages 17, such as by inputting specific page numbers or browsing through pages consecutively. Gestures may also be used for selecting pages using the touchscreen 12. For example, a right swipe at the top 22 of the touchscreen 12 may increment the currently displayed page, and a left swipe at the top 22 of the touchscreen 12 may decrement the currently displayed page. The controller 18 receives and interprets electronic signals intended to select pages. The controller 18 interprets these electronic page-selection signals to determine which of the pages 17 to display. In response to the page-selection signals, the controller 18 may retrieve the selected pages 17 from memory 14 and cause the selected pages 17 to be displayed on the touchscreen 12. In FIG. 1, the currently displayed page is diagrammatically labeled Page X, which is a specific one of the plurality of pages 17 in memory 14. Page X may actually have an actual page number, optionally displayed somewhere on the touchscreen 12.

FIG. 1 gives an example of holding, i.e. bookmarking, the currently displayed page X, analogously to how a user would hold a page 41 of the book 40. A user touches the touchscreen 12 within the display area 15 using a first finger 31. The touchscreen 12 senses the touch at a touch location 27 and generates a signal in response to the touch. The signal may indicate both the occurrence of the touch and the position of the touch relative to the display area 15 as a reference frame. The touch and the position of the touch location 27 is monitored by the controller 18. The controller 18 may monitor the touch, for example, to discern any interruptions in contact caused by removing the first finger 31 from the touchscreen 12 or from the display area 15 of the touchscreen 12. As long as the first finger 31 remains in contact with the touchscreen 12, the controller 18 may interpret the touch as being uninterrupted, even if the user intentionally or unintentionally slides the finger along the touchscreen 12 to change the position of the touch.

In response to the first finger 31 touching the touchscreen 12 while Page X is displayed, the controller 18 generates a bookmark B1 to associate the touch at touch location 27 with Page X. The bookmark B1 may be generated automatically in response to simply touching the touchscreen 12 while Page X is currently displayed. Additional conditions may also be applied to generate bookmark B1. For example, the bookmark B1 may be generated only after touching the touchscreen 12 for at least a predefined waiting period while Page X is currently displayed. This latter condition of waiting a predefined time period before generating the bookmark B1 helps confirm the intent to bookmark Page X. Alternatively, the bookmark B1 may be generated automatically only in response to the combination of both touching the touchscreen 12 when Page X is displayed and changing to another page. This latter condition of changing to another page before generating the bookmark B1 also helps confirm the intent to bookmark Page X.

The bookmark B1 may be stored in a bookmark register 37. The bookmark register 37 is a location in memory 14, which dynamically stores current bookmarks. As bookmarks are created they are added to the bookmark register; and as bookmarks are removed, they are removed from the bookmark register 37. The bookmark B1 is maintained for as long as the touch by first finger 31 is also maintained, and automatically removed in response to the first finger 31 being removed from the display area 15. As shown, this electronic association or bookmarking of Page X on the touchscreen device 10 is analogous to holding a page in the book 40 using the first finger 31. By placing the user's first finger 31 on the page of the book 40, the user can turn to different pages while "holding" a first, currently-displayed page 41 with the first finger 31. By analogy, the user may hold or bookmark Page X of the electronic document 16 for as long as the user maintains contact between the first finger 31 and the display area 15 of the touchscreen 12. The user may bookmark additional pages 17 of the e-document using additional fingers. By analogy, FIG. 1 shows a second finger 32 ready to be used to hold another page in the book 40.

Figure 2:
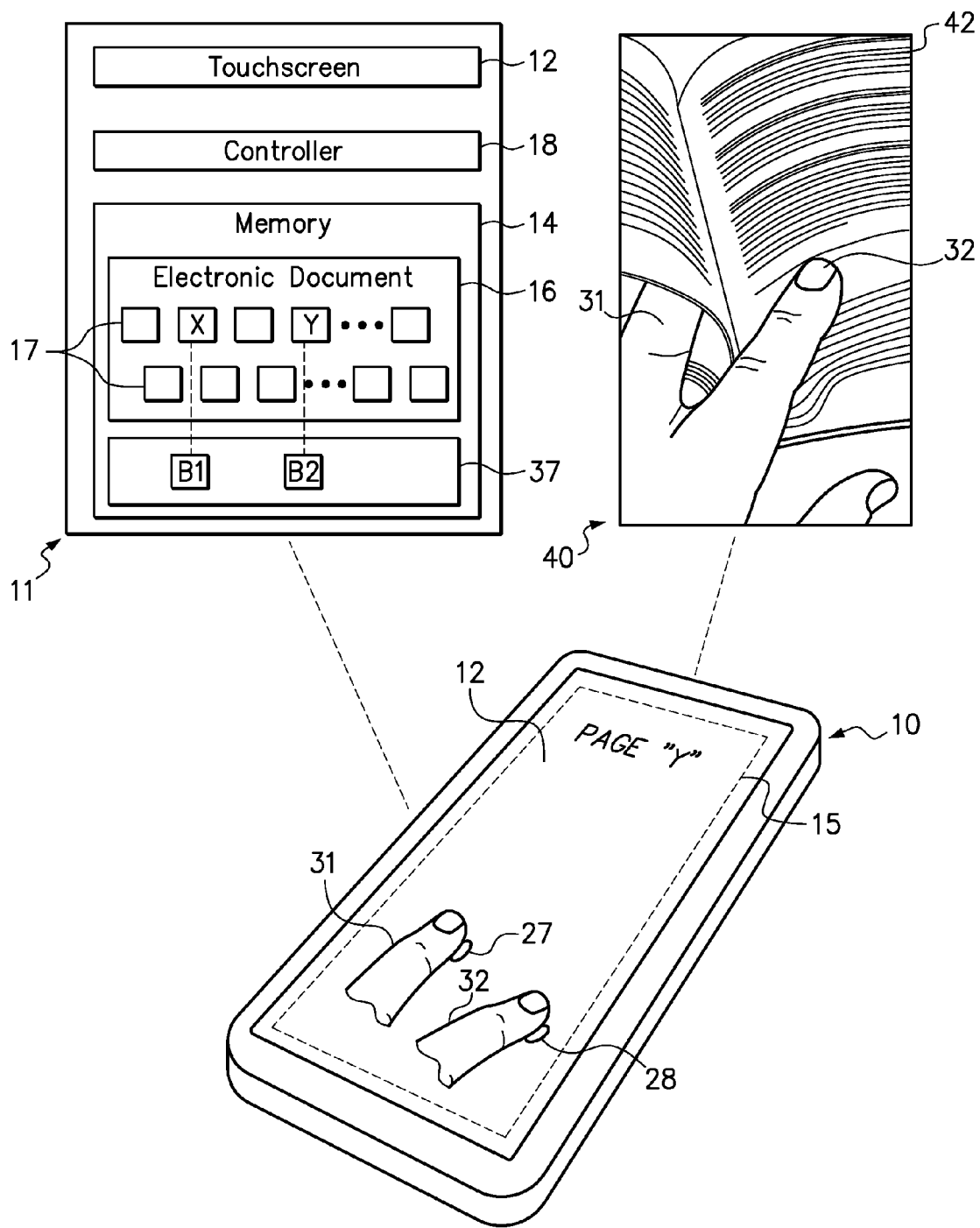
FIG. 2 is a schematic diagram of the touchscreen device, where a second bookmark has been created in response to touching the display area of the touchscreen at a second touch location.

FIG. 2 is a schematic diagram of the touchscreen device 10, where a second bookmark B2 has been created in response to touching the display area 15 of the touchscreen 12 at a second touch location 28 with a second finger 32. The user has navigated to a second page diagrammatically labeled in the figure as Page Y, while maintaining contact between the first finger 31 and the touchscreen 12. Thus, Page X remains bookmarked while Page Y is currently displayed. In response to the user touching the display area 15 with the second finger 32 while Page Y is displayed, the controller 18 generates a second bookmark B2 for Page Y. Bookmarks B1 and B2 are both currently recorded in the bookmark register 37. By analogy, maintaining contact between each of the two fingers 31, 32 and the display area 15 to hold Pages X and Y is like holding the first page 41 (see FIG. 1) and a second page 42 in the book 40 using the two fingers 31, 32.

Figure 3:
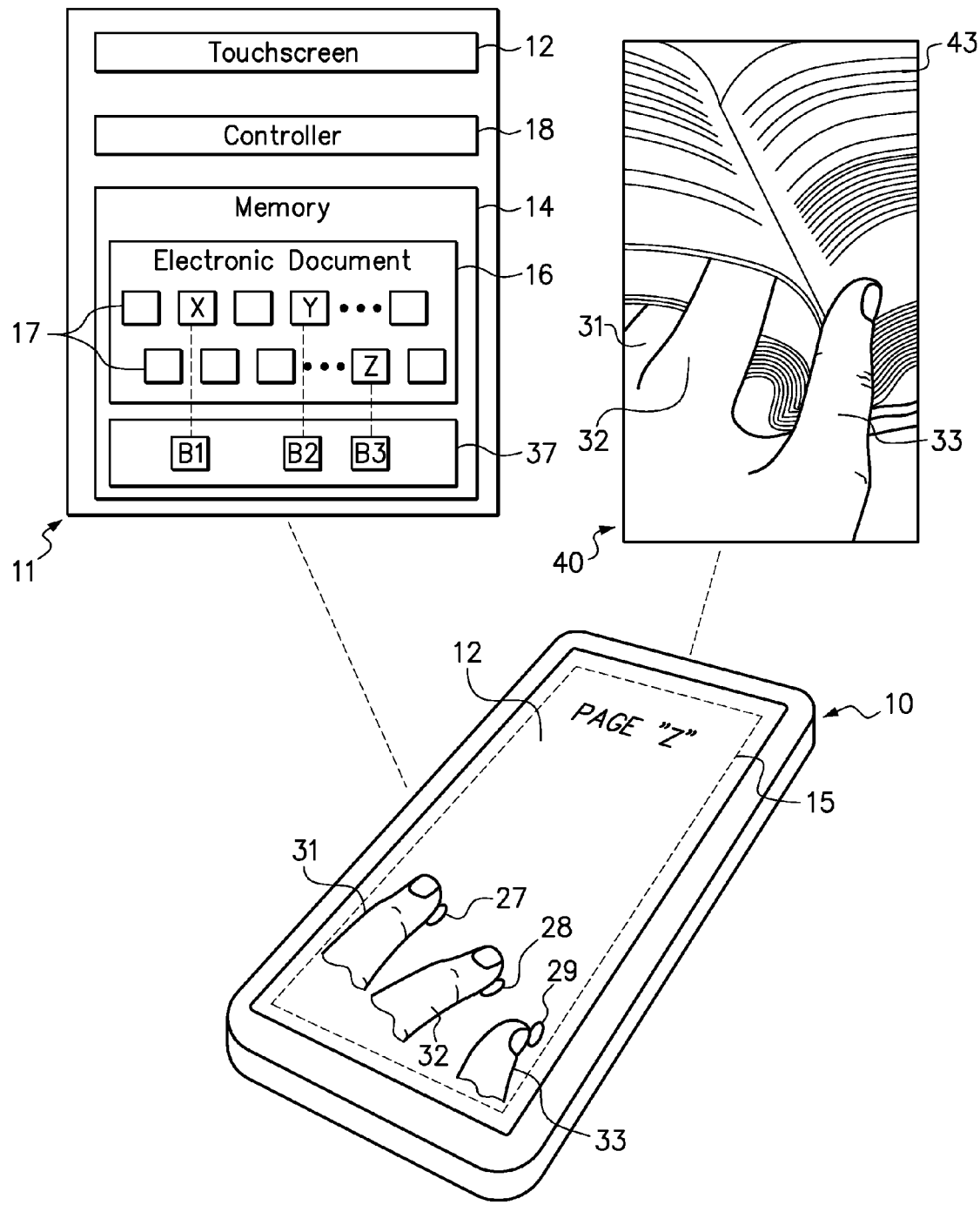
FIG. 3 is a schematic diagram of the touchscreen device, where a third bookmark has been created in response to touching the display area of the touchscreen at a third touch location.

FIG. 3 is a schematic diagram of the touchscreen device 10, where a third bookmark B3 has been created in response to touching the display area 15 of the touchscreen 12 at a third touch location 29 by a third finger 33. The user has navigated to a third page labeled in the figure as Page Z, while maintaining contact between each of the first and second fingers 31, 32 and the touchscreen 12. Thus, Page X and Y are still bookmarked, and Page Z is the currently displayed page. In response to the user touching the display area 15 with the third finger 33 while Page Z is displayed, the controller 18 has generated a third bookmark B3 for Page Z. Bookmarks B1, B2, and B3 are all three currently recorded in the bookmark register 37. All three bookmarks B1, B2, B3 may be maintained simultaneously using the three fingers 31, 32, 33. For example, the first finger 31 may be a middle finger or ring finger, the second finger 32 may be an index finger, and the third finger 33 may be a thumb, which may be easily held on the touchscreen 12 simultaneously. (Although in certain contexts a thumb is sometimes not considered a "finger," all five digits of a human hand are considered fingers in the present context.) By analogy, maintaining contact between each of the three fingers 31, 32, 33 and the display area 15 to maintain bookmarks for Pages X, Y, and Z is like holding the first page 41 (see FIG. 1), the second page 42 (see FIG. 2) and a third page 43 in the book 40 using the three fingers 31, 32, 33.

As has been previously noted, each bookmark is maintained for as long as the finger used to create that bookmark maintains uninterrupted contact with the display area 15 of the touchscreen 12. The bookmarks are created using the touchscreen 12 to facilitate optionally returning to the bookmarked pages 17. Sometimes a user will want to return to a bookmarked page. Other times, the user will want to simply remove a bookmark without returning to the bookmarked page, such as if the user no longer needs to hold that page 17. As will be shown in FIGS. 4 and 5, the user can invoke an additional action, such as to flip back to the bookmarked page before removing the bookmark or to remain on the currently displayed page, depending on the gesture leading up to the removal of a finger from the touchscreen.

Figure 4:
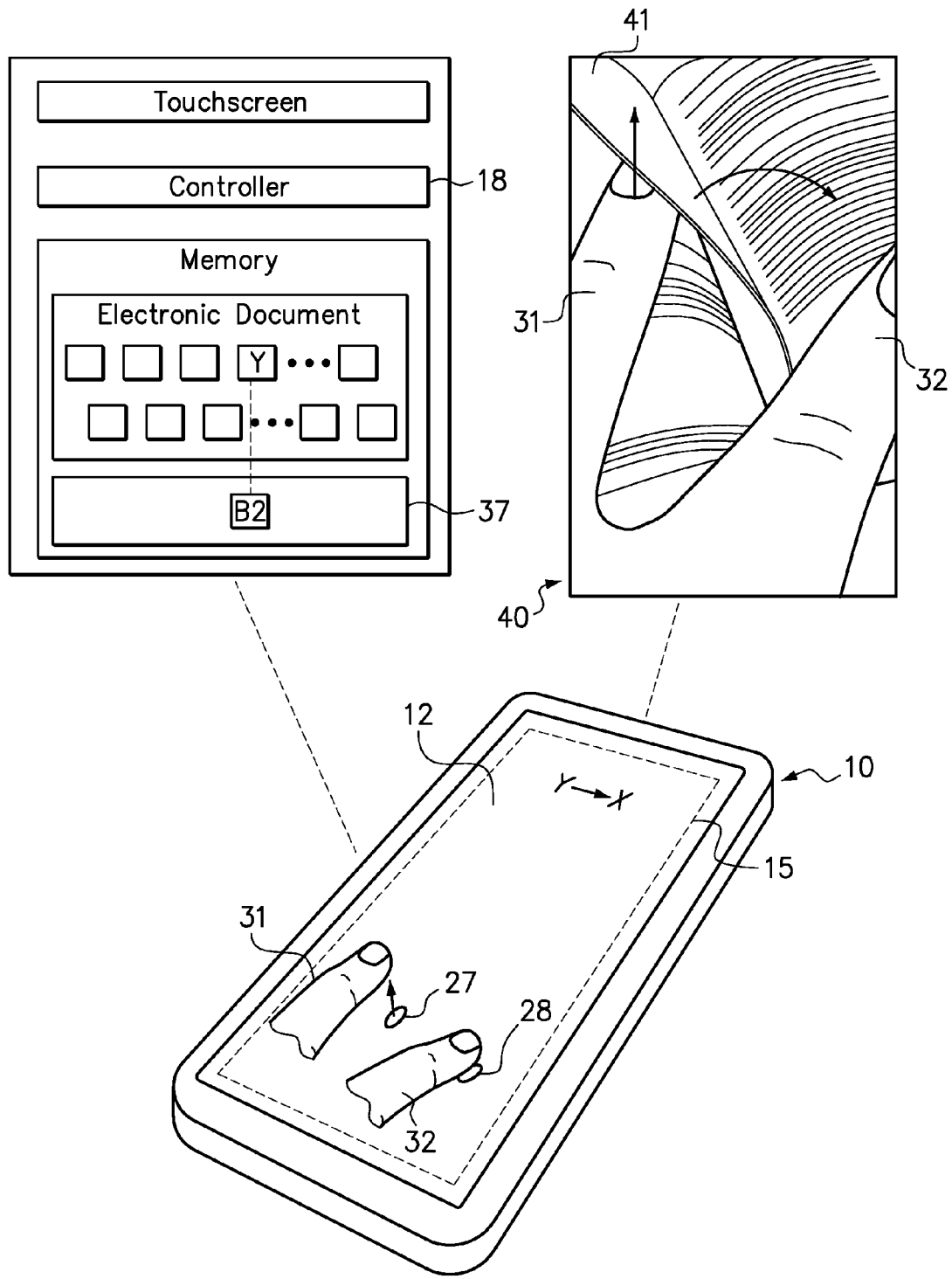
FIG. 4 is a schematic diagram of the touchscreen device illustrating a direct lift-off gesture for returning to a previously bookmarked page from another page, in conjunction with removing the bookmark.

FIG. 4 is a schematic diagram of the touchscreen device 10 illustrating a direct lift-off gesture for returning to a previously bookmarked page from another page, in conjunction with removing the bookmark. The two fingers 31, 32 were initially in contact with the touchscreen 12 to maintain bookmark Pages X and Y, respectively, as shown in FIG. 2. Page Y was currently displayed, when the user lifts up the first finger 31 away from the touchscreen 12. By removing the first finger 31 from the display screen, the bookmark for Page X is removed (bookmark B1 is no longer shown in the bookmark register 37). Moreover, the gesture that leads to the removal of the first finger 31 from the touchscreen 12 is a direct lift-off, in that there was no appreciable sliding of the first finger 31 along the touchscreen 12 immediately prior to removing the first finger 31. In response to the direct lift-off, the controller 18 returns to displaying Page X, which was the page bookmarked by the first finger 31 immediately prior to its removal from the touchscreen 12. By analogy, this direct lift-off of the first finger 31 mimics lifting the first finger away from the page of the book 40 held by the first finger 31 to return to the page held by the first finger 31 immediately prior to the direct lift-off.

The same direct lift-off gesture described in FIG. 4 using one finger may be invoked using two fingers to alternate between two bookmarked pages. The first finger 31 may be used to bookmark Page X and the second finger 32 may be used to bookmark Page Y. Then, by alternately lifting the first finger 31 and the second finger 32, the user can flip back and forth between Pages X and Y. For example, the user could lift the first finger to retrieve Page X, and view Page X for as long as desired. Then, the user could place the first finger 31 back down on the touchscreen 12 while viewing Page X to re-bookmark Page X, and then lift the second finger 32 to retrieve Page Y. Placing the second finger 32 back down on the touchscreen 12 while displaying Page Y would re-bookmark Page Y, so the user could again flip back to Page X by lifting the first finger 31. This alternating finger gesture may be used to flip as often as necessary between Pages X and Y. As a practical example of a user flipping back and forth between two pages, Page X may include a drawing and Page Y may include a description of the drawing on Page X, in which case the user may want to flip back and forth between the drawing (Page X) and its description (Page Y).

As described above, FIG. 4 illustrates the example of returning to a bookmarked page and simultaneously removing the bookmark from that page in response to a direct lift-off gesture. Any number of additional, optional gestures may be further defined. For example, another pre-defined gesture (not shown) may instead allow a user to return to a bookmarked page, but without removing the bookmark from the page. For example, the user may bookmark Page X with first finger 31, and then navigate to a higher page number (e.g. Page Y). To return to Page X without removing the bookmark for Page X, the user may swipe the first finger 31 to the right while maintaining contact with the touchscreen. This gesture mimics flipping pages of the book 40 to the right with a finger used to hold Page X, but still holding Page X with the finger Likewise, the user may bookmark Page X with first finger 31, and then navigate to a lower-number page (e.g. a Page "W"). To return from lower-number Page W to higher-number Page X without removing the bookmark for Page X, the user may swipe the first finger 31 to the left while maintaining contact with the touchscreen. This gesture mimics flipping pages of the book 40 to the left with a finger used to hold Page X, but still holding Page X with the finger. This optional two-finger gesture of sliding back and forth further mimics the handling of paper pages in a book. However, this gesture is not required to be included. In one implementation, a menu of such gestures may be provided in a software user interface (UI) for a user to pre-select which predefined gestures to make available.

Figure 5:
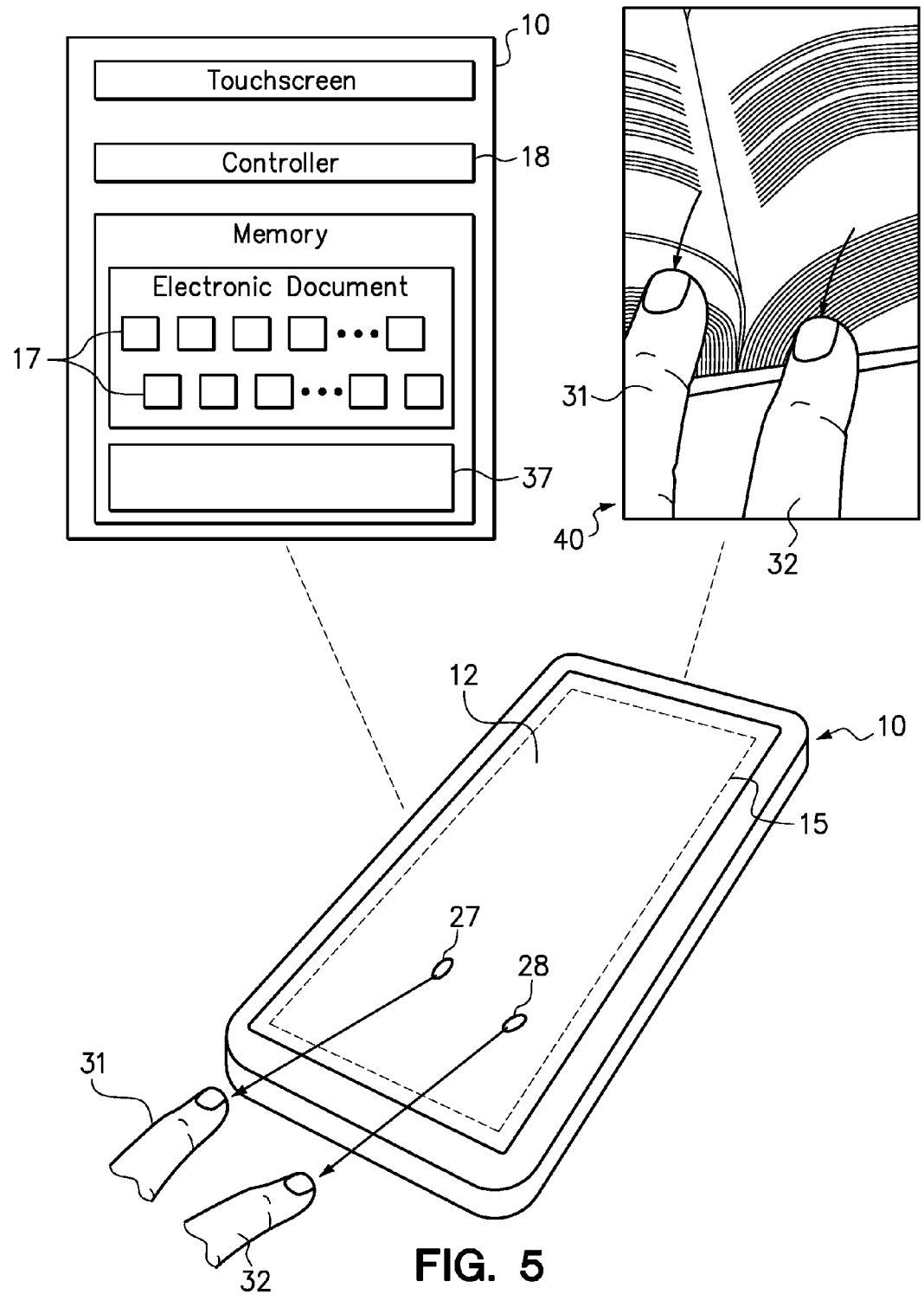
FIG. 5 is a schematic diagram of the touchscreen device, illustrating a sliding gesture for removing a bookmark without changing the currently displayed page.

FIG. 5 is a schematic diagram of the touchscreen device 10, illustrating a sliding gesture for removing a bookmark without changing the currently displayed page. The controller 18 may interpret a sliding gesture of a finger leading directly to the removal of that finger as an indication to remove the associated bookmark without changing pages. By way of example, two fingers 31, 32 are shown being removed simultaneously in this manner. The two fingers 31, 32 were both initially in contact with the touchscreen 12 at touch locations 27, 28 to bookmark Pages X and Y, respectively (see FIG. 2). The first and second fingers 31, 32 were then slid along the touchscreen 12 to outside of the display area 15 to remove the bookmarks associated with Pages X and Y. While this gesture is being performed by both fingers 31, 32 simultaneously, these are interpreted by the controller 18 as separate gestures for removing the respective bookmarks. Although not required, the fingers 31, 32 were slid to outside the display area 15, to confirm the user's intent that the bookmark(s) be removed. The removal of each finger 31, 32 from the display area 15 causes the controller 18 to remove each of the two bookmarks B1 and B2 for Pages X and Y (see FIG. 2). Additionally, the swipe by each finger leading to the removal of the fingers 31, 32 from the display area 15 signals to the controller 18 not to change the currently displayed page, regardless of which page 17 is currently displayed. This is analogous to handling pages of the book 40, wherein sliding the fingers 31, 32 off the respective pages of the book 40 (out from under any pages that may be covering one or more of the fingers) does not typically cause any pages of the book 40 to be turned, in contrast to lifting a finger away from the held pages (see FIG. 4).

Figure 6:
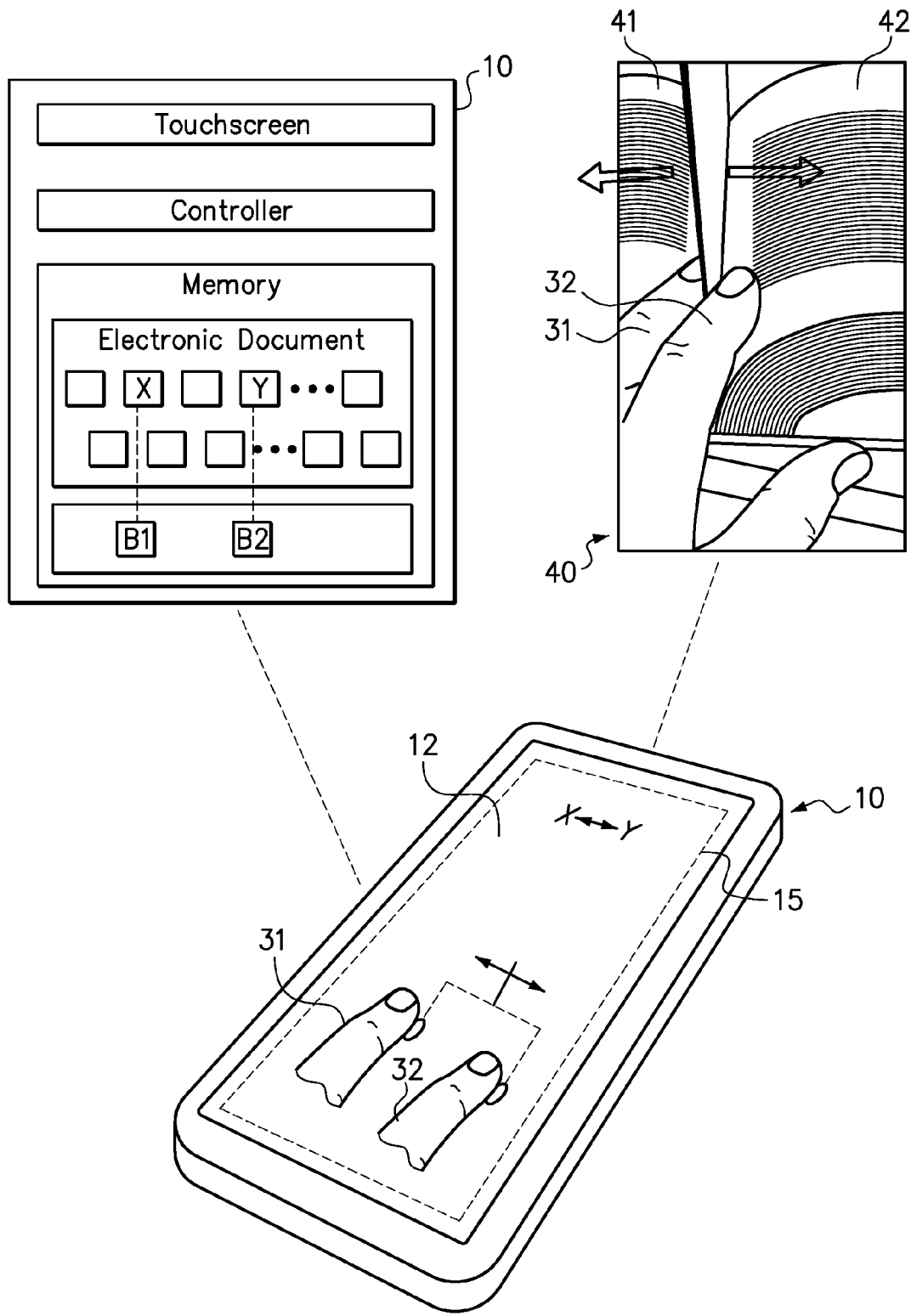
FIG. 6 is a schematic diagram of the touchscreen device, illustrating a two-finger gesture used to alternately switch between displaying two pages bookmarked by the respective fingers.

FIG. 6 is a schematic diagram of the touchscreen device 10, illustrating an alternative two-finger gesture used to alternately switch between displaying two pages bookmarked by the respective fingers. This is another example of an optional gesture that mimics the handling of paper pages, and which may be provided in a software UI for a user to pre-select if desired. The first and second fingers 31, 32 were previously used to bookmark Pages X and Y (see FIG. 2). The two fingers 31, 32 are then slid laterally back and forth within the display area 15 while maintaining contact between the two fingers 31, 32 and the touchscreen 12, to alternately display bookmarked Pages X and Y. This is analogous to holding separate pages 41, 42 of the book 40 with fingers 31, 32, respectively, and then moving the hand alternately left and right to flip between the two pages 41, 42. This multi-finger gesture may be applied to more than two fingers, as well, to progressively flip through bookmarked pages in response to sliding the fingers used to bookmark those pages. For example, with three fingers in simultaneous contact with the screen for bookmarking three respective pages, sliding the fingers to the left may flip from displaying the first bookmarked page to displaying the second bookmarked page, and with further sliding to the left, may flip from displaying the second bookmarked page to displaying the third bookmarked page. Likewise, sliding progressively back to the right may flip from displaying the third bookmarked page to the second bookmarked page and then to the first bookmarked page.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for navigating a multi-page electronic document displayed on a touchscreen, comprising:
    selectively displaying different pages of the multi-page electronic document in a display area of the touchscreen;
    in response to sensing a touch by a first finger on the display area, automatically bookmarking a first selected page currently displayed on the touchscreen;
    navigating to a second selected page for display on the touchscreen in response to receiving a user navigation command while the first finger maintains uninterrupted contact with the display area;
    while displaying the second selected page, sensing a touch to the display area by a second finger at a location spaced apart from the location touched by the first finger;
    bookmarking the second selected page in response to the touch by the second finger;
    switching from the second selected page back to the first selected page in response to a sliding gesture of the first and second touch in a direction away from the first touch toward the second touch;
    alternately switching from the first selected page back to the second selected page in response to a sliding gesture of the first and second touch in a direction away from the second touch toward the first touch; and
    automatically returning to the bookmarked first selected page for display on the touchscreen in response to sensing a first predefined gesture relative to the display area using the first finger.

2. The computer implemented method of claim 1, further comprising:
    bookmarking the currently displayed page only in response to the combination of sensing a touch by a first finger on the display area and navigating to another page while the first finger maintains uninterrupted contact with the display area.

3. The computer implemented method of claim 1, further comprising:
    automatically removing the bookmark in response to the removal of the first finger from contact with the display area.

4. The computer implemented method of claim 1, further comprising:
    automatically returning to the bookmarked first selected page in response to the predefined gesture being a direct lift-off of the first finger from the touchscreen; and
    automatically removing the bookmark from the first selected page in response to the direct lift-off.

5. The computer implemented method of claim 1, further comprising:
    automatically removing the bookmark from the first selected page and continuing to display the second selected page in response to a second predefined gesture other than the first predefined gesture.

6. The computer implemented method of claim 5, wherein the second predefined gesture comprises:
    a swipe leading to the removal of the first finger from the touchscreen.

7. The computer implemented method of claim 6, wherein the second predefined gesture further comprises:
    the swipe extending to outside a display area to which the second selected page is confined.

8. The computer implemented method of claim 1, further comprising:
    removing the bookmark of the second selected page in response to removal of the second finger from the touchscreen.

9. The computer implemented method of claim 1, further comprising:
    switching between displaying the first and second selected pages by alternately lifting one of the first and second fingers to display the respective one of the first and second bookmarked pages, re-touching the display area with the lifted one of the first and second fingers to re-bookmark the displayed page, and then lifting the other of the first and second fingers to display the other of the first and second bookmarked pages.

10. The computer implemented method of claim 1, further comprising:
    switching from a higher-numbered page back to the first selected page in response to a right swipe with the first finger or switching from a lower-numbered page back to the first selected page in response to a left swipe with the first finger.

11. The computer implemented method of claim 1, further comprising:
    displaying the first selected page in response to receiving user input selecting the first selected page; and
    displaying the second selected page in response to receiving user input using a finger other than the first finger.

12. The computer implemented method of claim 11, wherein the user input selecting the second selected page comprises a gesture in the display area at a location spaced from a location of the first touch by the first finger.

13. The computer implemented method of claim 11, wherein the user input selecting the second selected page comprises a pressing of a physical or virtual button.

14. The computer implemented method of claim 1, further comprising:
    limiting the display of the different pages to only one page at a time in the display area.

15. A computer program product including computer usable program code embodied on a non-transitory computer readable storage medium, the computer program product comprising:
    computer usable program code for selectively displaying different pages of a multi-page electronic document in a display area of a touchscreen;
    computer usable program code for automatically bookmarking a first selected page currently displayed on the touchscreen in response to sensing a touch by a first finger on the display area;
    computer usable program code for navigating to a second selected page for display on the touchscreen in response to receiving a user navigation command while the first finger maintains uninterrupted contact with the display area;
    computer usable program code for sensing, while displaying the second selected page, a touch to the display area by a second finger at a location spaced apart from the location touched by the first finger;

computer usable program code for bookmarking the second selected page in response to the touch by the second finger;

computer usable program code for switching from the second selected page back to the first selected page in response to a sliding gesture of the first and second touch in a direction away from the first touch toward the second touch;

computer usable program code for alternately switching from the first selected page back to the second selected page in response to a sliding gesture of the first and second touch in a direction away from the second touch toward the first touch; and computer usable program code for automatically returning to the bookmarked first selected page for display on the touchscreen in response to sensing a first predefined gesture relative to the display area using the first finger.

16. The computer program product of claim 15, further comprising:

computer usable program code for bookmarking the currently displayed page only in response to the combination of sensing a touch by a first finger on the display area and navigating to another page while the first finger maintains uninterrupted contact with the display area.

17. The computer program product of claim 15, further comprising:

computer usable program code for automatically removing the bookmark in response to the removal of the first finger from contact with the display area.

18. The computer program product of claim 15, further comprising:

computer usable program code for automatically returning to the bookmarked first selected page in response to the predefined gesture being a direct lift-off of the first finger from the touchscreen; and computer usable program code for automatically removing the bookmark from the first selected page in response to the direct lift-off.

19. A touchscreen device, comprising:

memory for storing a multi-page electronic document;

a touch-sensitive display screen configured for individually displaying selected pages of a multi-page electronic document in a display area, the touch-sensitive display screen being sensitive to a plurality of different touches spaced apart on the display screen; and a primary controller in communication with the touch-sensitive display screen and memory, the primary controller including control logic for selectively displaying different pages of the multi-page electronic document in the display area of touch-sensitive display screen, for automatically bookmarking a first selected page currently displayed on the touch-sensitive display screen in response to sensing a touch by a first finger on the display area, for navigating to a second selected page for display on the touch-sensitive display screen in response to receiving a user navigation command while the first finger maintains uninterrupted contact with the display area, for sensing, while displaying the second selected page, a touch to the display area by a second finger at a location spaced apart from the location touched by the first finger, for bookmarking the second selected page in response to the touch by the second finger, for switching from the second selected page back to the first selected page in response to a sliding gesture of the first and second touch in a direction away from the first touch toward the second touch, for alternately switching from the first selected page back to the second selected page in response to a sliding gesture of the first and second touch in a direction away from the second touch toward the first touch, and for automatically returning to the bookmarked first selected page for display on the touch-sensitive display screen in response to sensing a first predefined gesture relative to the display area using the first finger.

\* \* \* \* \*